United States Patent [19]

Smart

[11] 3,979,553
[45] Sept. 7, 1976

[54] SPACER-DAMPERS FOR POWER TRANSMISSION LINES

[75] Inventor: Thomas John Smart, Oadby, England

[73] Assignee: Dunlop Limited, London, England

[22] Filed: Dec. 9, 1974

[21] Appl. No.: 531,073

[30] Foreign Application Priority Data
Dec. 13, 1973 United Kingdom............... 57940/73

[52] U.S. Cl.................................... 174/42; 174/146
[51] Int. Cl.²...................... H02G 7/14; H02G 7/12
[58] Field of Search............................ 174/42, 146

[56] References Cited
UNITED STATES PATENTS

| | | | |
|---|---|---|---|
| 3,083,258 | 3/1963 | Edwards et al. | 174/42 |
| 3,475,544 | 10/1969 | Reed | 174/42 |
| 3,609,209 | 9/1971 | Houston et al. | 174/42 |
| 3,613,104 | 10/1971 | Bradshaw | 174/42 |
| 3,762,747 | 10/1973 | Griffen | 403/225 |
| 3,784,723 | 1/1974 | Cantamessa | 174/42 |

FOREIGN PATENTS OR APPLICATIONS

| | | | |
|---|---|---|---|
| 1,098,813 | 1/1968 | United Kingdom | 174/146 |

*Primary Examiner*—Laramie E. Askin
*Attorney, Agent, or Firm*—Stevens, Davis, Miller & Mosher

[57] ABSTRACT

A spacer-damper for overhead transmission lines of at least three subconductors comprising arms, one for each subconductor, mounted by resilient damping means to a rigid frame. Each arm has a cable clamp at one end and at least two of the arms extend from the frame so that a line between the clamp and the other end of the arm is in a direction generally perpendicular to a plane including the axis of the bundle and the center line of the subconductor engaged by the clamp.

9 Claims, 4 Drawing Figures

SPACER-DAMPERS FOR POWER TRANSMISSION LINES

This invention relates to spacer-dampers for overhead power transmission lines.

Spacer-dampers are well known in which a frame within the subconductor bundle has arms resiliently mounted upon it, one arm being provided for clamping to each subconductor. The arms in early designs were disposed horizontally to provide for damping of vertical subconductor vibrations. Later designs use arms at 45° to the horizontal such that horizontal movements may also be damped.

According to the present invention a spacer-damper for an overhead power transmission line having at least three subconductors per bundle comprises a rigid arm for each sub-conductor having a clamp at one end for attachment to a sub-conductor, at least two of the arms each extending in the rest position of the spacer-damper so that the line between the clamp and the other end of the arm is in a direction generally perpendicular to a plane including the axis of the bundle and the center line of the respective sub-conductor, a rigid frame providing attachment points outside the bundle for the other end of each arm and damping means between said other ends and attachment points so that sub-conductor movement in the planes defined is damped by the resilient means in addition to vertical and horizontal sub-conductor movements.

Preferably each of the arms of the spacer-damper extends in the rest position in the defined directions.

In one preferred embodiment the arms are substantially perpendicular to the direction defined but the invention is understood to include by the term, generally, arm angles up to 30° from the perpendicular direction specified. Such angles provide for damping in the plane defined and further allow increased damping to be achieved in the horizontal and vertical directions of the bundle depending on the prevalent oscillations in the transmission line concerned, it being well known that due to variable environmental characteristics, some transmission lines are particularly prone to one or another type of oscillation.

Each of the arms may extend in either direction from the plane defined and in a preferred arrangement for a quad subconductor bundle the top arms extend downwardly and the bottom arms extend upwardly toward the conductors.

The rigid frame is preferably substantially within the bundle and provided with extensions to form the required attachment points outside the bundle. Alternatively, the rigid frame may be entirely outside the bundle.

Corona protection may be provided for the spacer-damper by means of large radius shields attached to or formed in the attachment points to allow satisfactory transmission at ultra high line voltages.

The resilient means may comprise cylindrical bushes or washers of elastomeric material which are mounted with their axes parallel to the center line of the bundle. The bushes or washers may be bonded directly to the attachment points and the arms but in a preferred arrangement the bushes or washers are bonded to backing members which are in turn connected to the attachment points and arms. This latter connection may be made by bonding or by a mechanical lock such as an interference fit.

In one preferred arrangement the resilient means comprises a cylindrical rubber bush which is loaded in torsional shear when the spacer arms are moved by movement in the horizontal, vetical or defined planes.

In another arrangement the resilient means provides also for relative displacement of the other end of the arm and the attachment means in the plane of spacer frame and arms. This may be allowed by means of slots or apertures provided in the cylindrical bushes or by providing clearance in the required directions about resilient washers which are then deformed in shear.

Mechanical stops are conveniently provided to prevent excessive arm movement.

Further features of the invention will be apparent from the following description of two embodiments of the invention, by way of example only, in conjunction with the attached drawings in which.

Figure 1:
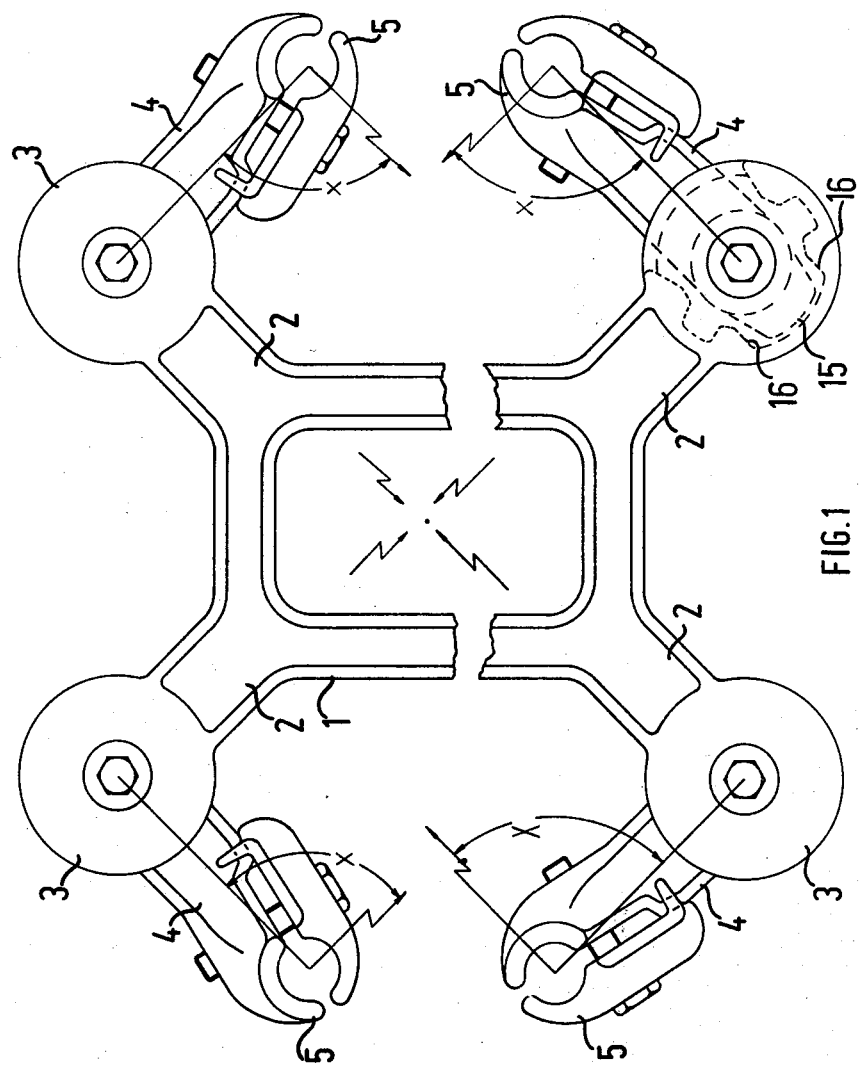
FIG. 1 shows an assembled spacer-damper according to the present invention

The spacer-damper shown in FIG. 1 is for an 18 × 18 inches separation quadruple sub-conductor bundle and comprises a cast frame 1 of rectangular outline having a projection 2 at each corner which extends outside the sub-conductor bundle outline. Each projection 2 terminates in an abutment 3 to which is resiliently attached an arm 4.

Each arm 4 has provided at one end a clamp 5 for assembly onto a subconductor in conventional manner and is mounted from the abutment 3 such that in the rest condition the line between the clamp and the other end of the arm is at an angle 'X' = 90° to a plane through the bundle center line and the center line of its subconductor as shown for the lower right hand arm in FIG. 1.

Figure 2:
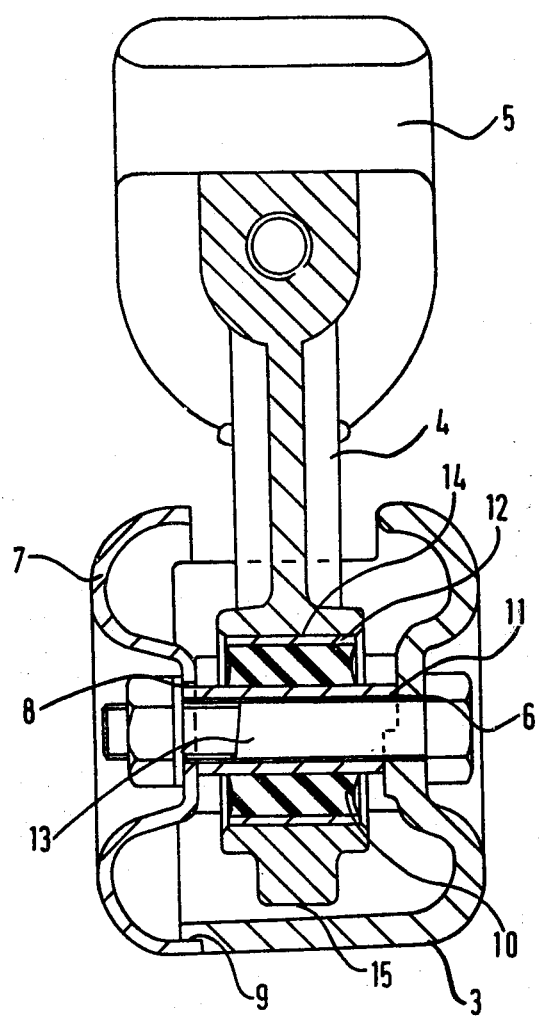
FIG. 2 is a sectional view showing the resilient means between an arm and the frame.

The resilient attachment between the abutment 3 and the arm 4 is shown in detail in FIG. 2. The abutment 3 is generally circular and has a central hole 6. A clamping plate 7 having a hole 8 engages a groove 9 so that engagement of the plate 7 and the abutment 3 causes the holes 6 and 8 to be aligned. Lugs are provided on the plate 7 to prevent it rotating upon the abutment 3. A cylindrical rubber bush 10 comprising an inner 11 and outer 12 metal sleeve bonded to rubber under pre-compression is mounted by clamping the inner sleeve 11 between the plate 7 and abutment 3 by a nut and bolt 13. The outer sleeve 12 is an interference fit in a bore 14 provided in the end of the arm 4.

The arm 4 also includes a projection 15 to act against stops 16 formed in the abutment 3 to prevent excessive arm movement.

In operation subconductor movements in the vertical and horizontal directions of the bundle and the defined planes all cause the arms to pivot about the resilient bushes which are loaded in shear. Hysteresis losses within the bushes damp the movements. Conical deformation of the resilient bush allows for limited longitudinal relative movement between the subconductors. The spacer-damper is thus able to absorb and damp movements of the subconductors in more directions than hitherto.

The cover plate 7 as well as the frame 1 and abutment 3 are radiused to provide adequate resistance to corona discharge. The elastomeric material of the bushes may be semi-conducting in order to prevent a potential gradient being established across the spacer. The materials may be any of those known in the art for overhead conductor spacer-dampers (e.g. natural rubber, silicone rubber, polypropylene or ethylene type polymers).

As an alternative to the press fit of the outer 12 to the arm 4, chemical bonding may be used or mechanical interlocking.

The cylindrical bush may be formed with holes or apertures therein dependent on the stiffnesses required in the various directions.

Figure 3:
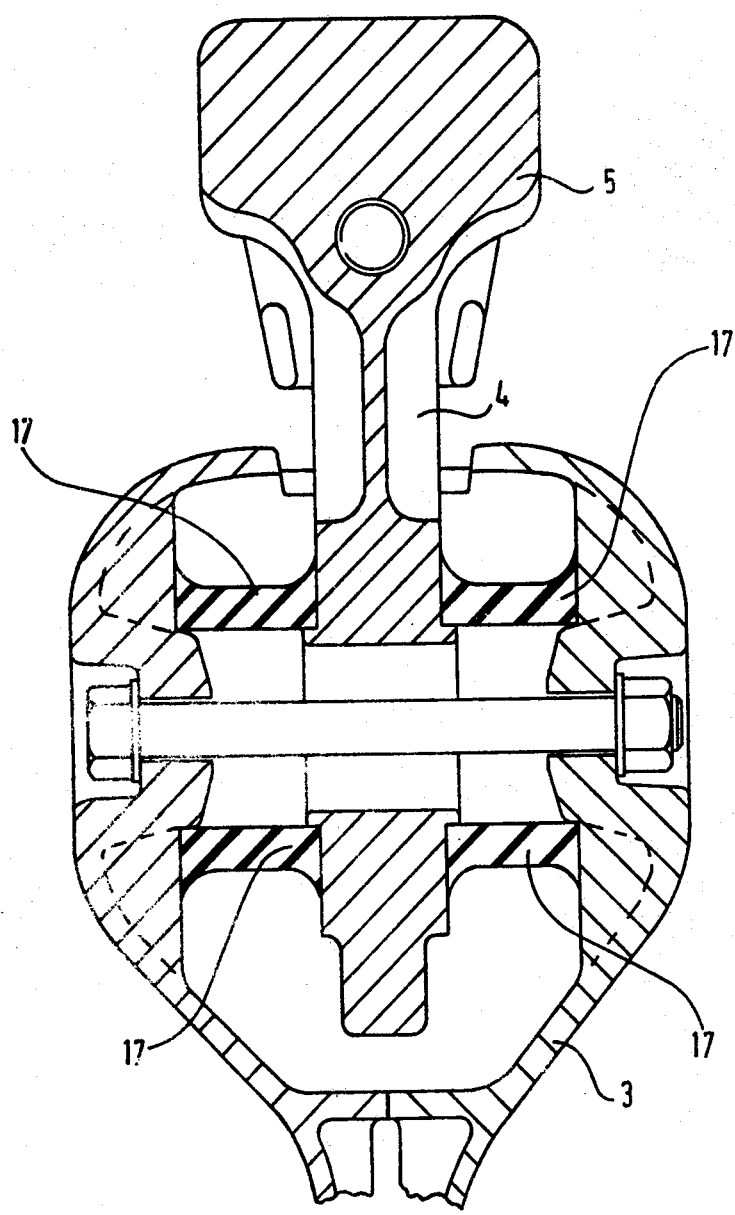
FIG. 3 shows an alternative resilient means to FIG. 2.

In another embodiment, shown in FIG. 3, the resilient cylinder is replaced by a pair of washers 17 formed of elastomeric material. Each washer 17 is mounted with its axis as shown, in the same direction as the axis of the cylinder in the previous embodiment and the arm 4 and abutments 3 are connected by bonding to the washers. Clearance is left in the radial direction of the washers to allow radial movement between the arm and abutment. The arm is thus allowed to move in all directions to provide damping including the direction of the center line of the arm. As an alternative to direct bonding, mechanical engagement by means of corrugations on the side faces of the washers 17 or bonding to plates which are in turn mechanically fastened to the arm 4 and abutments 3 may be used.

Figure 4:
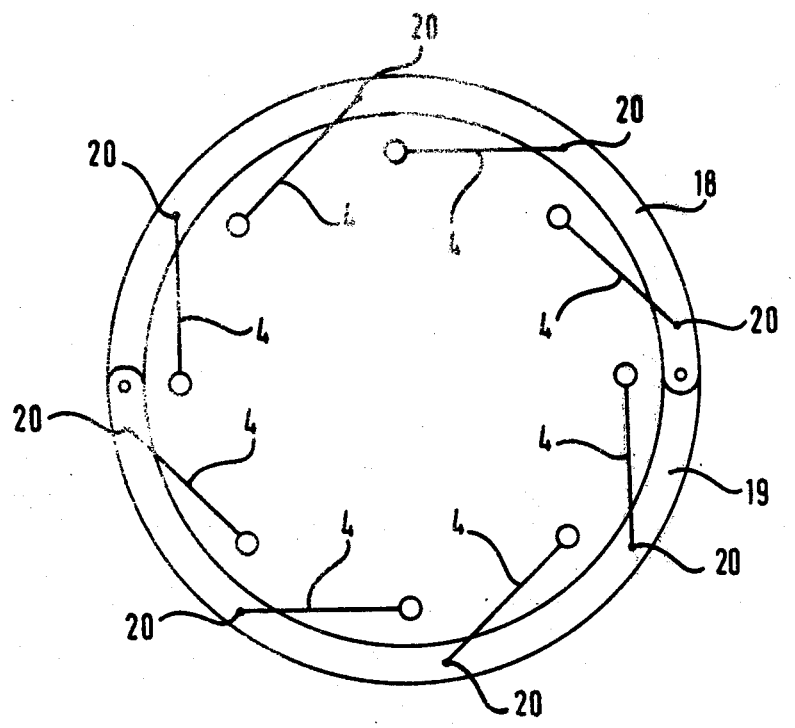
FIG. 4 shows the geometrical arrangement of an alternative spacer-damper for a bundle of eight subconductors.

As an alternative to the rigid frame being within the bundle, outline the frame may be partially or entirely outside the bundle outline. A spacer-damper having such an external frame and designed for eight subconductors is shown in FIG. 4. Such an arrangement may be preferable when corona discharge problems are met which cannot be overcome by the usual expedients of large radii on castings and conventional corona shielding. The spacer-damper comprises two hinged sections 18, 19 to allow it to be easily attached to a line, and a series of arms 4 are mounted on the frame by pivoted connections 20 as used in the previous embodiment.

Having now described by invention — what I claim is:

1. A spacer-damper for an overhead power transmission line having at least three subconductors per bundle, comprising:
   a. a rigid frame means;
   b. a plurality of rigid arm means for supporting, respectively, the subconductors, each of said rigid arm means having, at one end, a clamp means for attachment to a respective subconductor, said rigid arm means being spaced apart from one another, at least two of said arm means extending in the rest position of the spacer-damper so that, for each of said two arm means, a line between said clamp means and the other end of said arm means is in a direction extending generally perpendicular to a plane including the axis of the rigid frame means and the center line of a respective clamp means; said rigid frame means providing attachment points at which said other end of each said arm means is attached; and
   c. a plurality of resilient damping means for damping movement of the respective subconductors in said plane, in a vertical direction and in a horizontal direction, each of said resilient damping means being located between said other end of one of said arm means and said frame means at one of said attachment points and having a pivotal axis lying parallel to the axis of the clamp means.

2. A spacer-damper according to claim 1 wherein all of said arm means extend in the rest position of the spacer-damper so that, for each of all of said arm means, a line between said clamp means and the other end of said arm means is in a direction extending generally perpendicular to a plane including the axis of the rigid frame means and the center line of a respective clamp means.

3. A spacer-damper according to claim 1 wherein the rigid frame means is substantially within the outline of the clamp means and has extensions outside the outline of the clamp means constituting the required attachment points.

4. A spacer-damper according to claim 3 wherein relatively large radius corona discharge shields are formed on the extensions.

5. A spacer-damper according to claim 1 wherein the rigid frame means is outside the outline of the clamp means and the arm means extend inwardly of the frame means each in the direction extending generally perpendicular to a plane including the axis of the rigid frame means and the center line of a respective clamp means.

6. A spacer-damper according to claim 1 wherein the resilient damping means comprise cylinders of elastomeric material.

7. A spacer-damper according to claim 6 wherein the elastomeric material includes slots to provide a predetermined stiffness in the material.

8. A spacer-damper according to claim 1 wherein the resilient damping means comprise washers of elastomeric material.

9. A spacer-damper according to claim 1 for a quad bundle having four subconductors, two of the subconductors extending above the other two subconductors, wherein said plurality of arm means comprises two upper arm means and two lower arm means for supporting the quad bundle, wherein said two upper arms extend in one direction to said plane, and wherein said two lower arm means extend to said plane in a direction different from the one direction.

* * * * *